Dec. 8, 1936.                H. R. TEAR                 2,063,410
                         LUBRICATING DEVICE
                      Original Filed Oct. 15, 1932

INVENTOR
HARRY R. TEAR.
BY
ATTORNEY

Patented Dec. 8, 1936

2,063,410

UNITED STATES PATENT OFFICE 2,063,410

LUBRICATING DEVICE

Harry R. Tear, Evanston, Ill., assignor to The Lubrication Corporation, a corporation of Delaware Original application October 15, 1932, Serial No. 637,916. Divided and this application March 18, 1935, Serial No. 11,552

5 Claims. (Cl. 221—47.3)

This invention relates to improvements in lubricating devices, and more particularly, to lubricant guns and lubricant cartridges therefor. This application is a division of my co-pending application Serial No. 637,916 filed October 15, 1932.

An object of the invention is to provide a lubricant gun or dispenser, and cartridge therefor, wherein simple and effective means is employed for simultaneously securing the cartridge to the gun and for establishing a fluid tight seal therebetween.

A further object is to provide gun cartridge mounting means effective to provide a lubricant tight seal between the cartridge and the gun of a character wherein forces tending to move the cartridge out of normal position relative to the gun may not destroy the seal therebetween. This feature is of particular importance in such cases as where no protective housing is employed to surround the cartridge.

Figure 1:
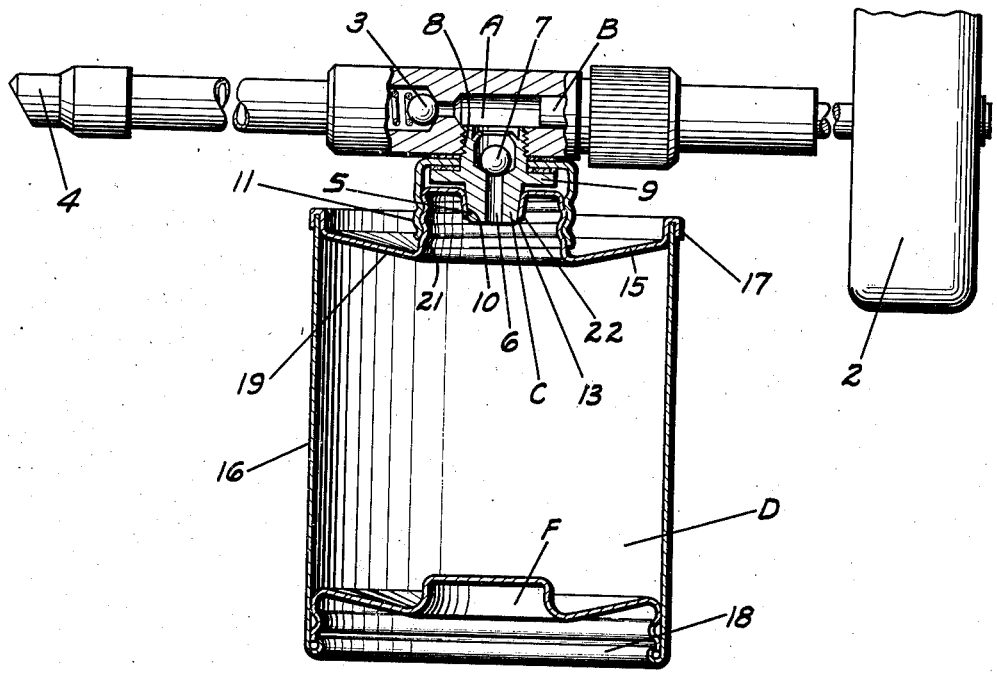
Figure 2:
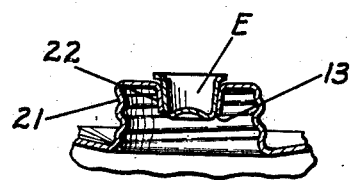

Other objects, the advantages and uses of the invention, will be apparent after reading the following description and claims and after consideration of the accompanying drawing forming a part of this specification, in which:

Fig. 1 is an elevation, partly in section, of a hand lubricant gun and cartridge affixed thereto constructed in accordance with the invention; and Fig. 2 is a fragmentary sectional view of the cartridge structure with its closure cap in place.

In general the device selected for illustration herein comprises a lubricant gun of the hand operated type having a pressure cylinder A within which a piston B is mounted for manual operation, a cartridge connector stud assembly C for supporting the lubricant cartridge D upon the gun, for establishing communication between the cartridge and pressure cylinder A, and for simultaneously providing a lubricant tight seal therebetween, a closure cap E for the cartridge for use in sealing the cartridge when not in place upon the gun, and a piston follower F within the cartridge adapted to move under atmospheric pressure to follow the lubricant as it is withdrawn therefrom into the pressure cylinder A.

Referring particularly to Fig. 1, the lubricant gun illustrated is of the simple hand type having a hand grip 2 upon the outer end of the piston B, an outlet check valve 3 for the cylinder A and a discharge nozzle 4 adapted for engagement with a lubricant receiving fitting (not shown). The cartridge connector stud assembly C includes a connector stud 5 having a passageway 6 therethrough, a check valve 7 in the passageway and an externally threaded shank 8 for reception and support within an internally threaded bore through the side wall of the cylinder A. The connector stud 5 is further formed with a hexagonal flange 9, for turning the stud in place within the threaded bore of the cylinder wall, and a slightly tapered external wall portion 10 below the flange 9. A screw threaded socket 11 encompassing the stud serves as a means for drawing the cartridge into engagement with the stud as hereafter described.

The cartridge D is preferably cylindrical in form, having one end closed by an end plate 15 through which the outlet 13 is provided. The end plate may be secured to the side walls 16 of the cartridge by a seam 17 so as to become a permanent part of the cartridge. The lower end of the side walls 16 may be rolled inwardly as shown at 18 for the purpose of reinforcement and for retaining the follower F against removal from within the cartridge. The central portion 19 of the end plate 15 presents an outwardly extending conical wall.

The contour of the follower piston F is such as to closely follow that of the inner wall of the end plate 15, an arrangement which assures the removal of all of the cartridge contents.

The head 15 of the cartridge D is formed with a centrally projecting portion 21 formed with screw threads upon the side wall thereof which are engageable with the threaded socket 11, forming a part of the cartridge stud assembly. The socket 11 may be fixed between the flanged portion 9 of the stud C and the adjacent wall of the gun cylinder A as shown in Fig. 1. A lubricant tight seal between the cartridge outlet opening and the stud 5 is established through the medium of the slight taper formed on the side wall of the stud as shown at 10, which provides a wedging action between the stud and a similarly tapered side wall 22 of the opening 13 when the threaded portion 21 of the cartridge is screwed into the socket 11. The side wall 22 of the outlet opening 13 is located centrally of the threaded portion 21 of the cartridge. The closure E is provided with a tapered side wall as shown in Fig. 2 and when in place will remain so due to friction until pried away at such time as when the cartridge is to be placed upon the gun.

In use the cartridge D may be supplied to the consumer with the cap closure E in place to seal the outlet opening 13 of the cartridge, the follower piston F serving as a lower end wall of the cartridge. To install the cartridge upon the gun, the operator may remove the closure E and screw the cartridge in place within the socket 11 until the surface 10 of the stud engages tightly with the wall 22 of the cartridge outlet thereby through wedging action to provide a lubricant tight seal therebetween. The seal thus formed may not be impaired by jar or impact applied to the cartridge or by forces tending to cause relative angular movement therebetween as the head structure 15 of the cartridge affords relatively high flexibility.

It is to be understood that the described embodiments of the invention herein set forth are presented for the purpose of illustration only and various changes may be made therein without departing from the spirit and scope of the invention.

I claim:

1. In combination, a lubricant feeding device having a cartridge connector assembly including a tubular stud and a threaded socket rigidly connected to and concentric with said stud, and a lubricant cartridge having an end wall formed with a threaded extension for reception in said socket and having a lubricant outlet opening centrally located in said extension, the walls of which are adapted to closely receive and to form a lubricant tight seal with said stud when said cartridge is screwed into said socket.

2. In combination, a lubricant feeding device having a cartridge connector assembly including a tubular stud and a threaded socket rigidly connected to and concentric with said stud, and a lubricant cartridge having an end wall formed with a threaded extension for reception in said socket and having a lubricant outlet opening centrally located in said extension, the walls of which are adapted to closely receive and to form a lubricant tight seal with said stud when said cartridge is screwed into said socket, said stud and said lubricant outlet wall being tapered to provide tight engagement with one another by a wedging action.

3. In combination, a lubricant feeding device having a cartridge connector assembly including a tubular stud and a threaded socket rigidly connected to and concentric with said stud, and a lubricant cartridge having a thin sheet-metal threaded extension for reception in said socket, said extension terminating in a flat relatively flexible end wall formed with a centrally located outlet orifice, the walls of which are adapted for sealing engagement with said stud when the extension is screwed into the socket.

4. In combination, a lubricant feeding device having a cartridge connector assembly comprising a tubular stud and a socket rigidly connected to and concentric with and at least as long axially as said stud, and a cartridge having an extension adapted to be secured in said socket, the walls of said extension being turned inwardly at one end and adapted for sealing engagement with said stud when the extension is secured in the socket.

5. In combination, a lubricant feeding device having a cartridge connector assembly comprising a tubular stud and a socket rigidly secured to and concentric with said stud, and a cartridge having an extension formed with a centrally located outlet opening, the walls of which are adapted for sealing engagement with the stud, and cooperating means on the socket and the extension for securing the extension in the socket and pressing the walls of the outlet opening into sealing engagement with the stud when the cartridge is rotated relatively to the socket and the stud.

HARRY R. TEAR.